US012367083B2

(12) United States Patent
Flores et al.

(10) Patent No.: US 12,367,083 B2
(45) Date of Patent: Jul. 22, 2025

(54) ADAPTER ORCHESTRATION AS A SERVICE

(71) Applicant: Boomi, LP, Conshohocken, PA (US)

(72) Inventors: Alejandro Flores, Bethany, NY (US); Madhav Srimadh Bhagavatam, Austin, TX (US); Ed Macosky, Livermore, CA (US); Rajesh Raheja, Cupertino, CA (US); Dana Burkart, San Jose, CA (US)

(73) Assignee: Boomi, LP, Conshohocken, PA (US)

( * ) Notice: Subject to any disclaimer, the term of this patent is extended or adjusted under 35 U.S.C. 154(b) by 434 days.

(21) Appl. No.: 17/984,030

(22) Filed: Nov. 9, 2022

(65) Prior Publication Data

US 2023/0142150 A1    May 11, 2023

Related U.S. Application Data

(60) Provisional application No. 63/278,006, filed on Nov. 10, 2021.

(51) Int. Cl.
*G06F 9/54* (2006.01)

(52) U.S. Cl.
CPC .............. *G06F 9/541* (2013.01); *G06F 9/547* (2013.01)

(58) Field of Classification Search
CPC ................................ G06F 9/541; G06F 9/547
See application file for complete search history.

(56) References Cited

U.S. PATENT DOCUMENTS

| | | | | |
|---|---|---|---|---|
| 10,956,242 | B1* | 3/2021 | Kumar | G06F 8/76 |
| 11,720,539 | B1* | 8/2023 | Schnase | G06F 16/258 |
| | | | | 707/804 |
| 2020/0228880 | A1* | 7/2020 | Iyer | H04N 21/251 |
| 2020/0233877 | A1* | 7/2020 | Patel | G06F 16/2282 |
| 2020/0387415 | A1* | 12/2020 | Take | G06Q 50/10 |
| 2021/0029225 | A1* | 1/2021 | Laurenti | H04R 17/10 |
| 2021/0144517 | A1* | 5/2021 | Guim Bernat | H04L 47/781 |
| 2021/0203714 | A1* | 7/2021 | Devta | H04L 67/34 |
| 2023/0147814 | A1* | 5/2023 | Carver | B60L 53/67 |
| | | | | 701/3 |
| 2024/0095100 | A1* | 3/2024 | Pateromichelakis | G06F 9/541 |

* cited by examiner

*Primary Examiner* — Schquita D Goodwin
(74) *Attorney, Agent, or Firm* — Procopio, Cory, Hargreaves & Savitch LLP (57) ABSTRACT

Conventionally, users of integration platforms, or other platforms that utilize many different services, must install, manage, configure, and administer the underlying resources for connectivity with the platforms. Adapter orchestration as a service (AOaaS) simplifies this process by enabling users to quickly and easily deploy an adapter orchestration service comprising instances of selected adapters for multiple services in discrete, autonomous containers that can be spun up and down as needed. The adapters may translate data for all of the services to a common format. Clients may access the data for all of the adapters in the adapter orchestration service via a single application programming interface (API) of the adapter orchestration service, which provides access to the data in the common format.

20 Claims, 5 Drawing Sheets

ADAPTER ORCHESTRATION AS A SERVICE

CROSS-REFERENCE TO RELATED APPLICATIONS

The present application claims priority to U.S. Provisional Patent App. No. 63/278,006, filed on Nov. 10, 2021, which is hereby incorporated herein by reference as if set forth in full.

BACKGROUND

Field of the Invention

The embodiments described herein are generally directed to communication interfaces between software, and more particularly, to adapter orchestration as a service.

Description of the Related Art

Integration platform as a service (iPaaS) enables the integration of applications and data as a dynamic and elastic stand-up service. The iPaaS platform provided by Boomi® of Chesterbrook, Pennsylvania, enables users to construct integration platforms from pre-built components. These components can be connected together in endless combinations to build simple to very complex integrations.

One type of component in integration platforms is an adapter. Adapters provide data connections between applications and/or services. Conventionally, users of an iPaaS must install, manage, configure, and administer underlying resources to take advantage of the set of adapters required for their integrations. For example, these adapters require compute capacity in order to be properly instantiated (e.g., on a Java virtual machine) and to manage the ingress and/or egress of data between endpoints.

SUMMARY

Accordingly, systems, methods, and non-transitory computer-readable media are disclosed for adapter orchestration as a service (AOaaS). Disclosed embodiments may decouple adapters from integration platforms and any other particular process, such that adapters may be dynamically spun up for any purpose and scenario, and in any environment.

In an embodiment, a method of adapter orchestration as a service (AOaaS) comprises using at least one hardware processor to: receive a selection of one or more adapters from a catalog; add the selected one or more adapters to an adapter set; and deploy the adapter set within an adapter orchestration service to at least one destination system, wherein each of the one or more adapters translate data between a domain-specific format and a standard internal format, and wherein the adapter orchestration service comprises a first application programming interface that comprises one or more functions for interacting with the data in the standard internal format.

In an embodiment, the adapter orchestration service further comprises a second application programming interface that comprises one or more functions that spin up a new instance of at least one of the one or more adapters in the adapter set.

In an embodiment, spinning up the new instance of the at least one adapter comprises: receiving a request from an AOaaS client, wherein the request comprises a connection object and adapter information for at least one adapter; extracting the connection object from the request; launching an adapter container based on the adapter information; injecting the connection object into memory of the adapter container; and running the adapter container as an instance of the at least one adapter.

In an embodiment, the adapter container comprises adapter code and supporting code.

In an embodiment, the adapter orchestration service further comprises a second application programming interface that comprises one or more functions that spin down an existing instance of at least one of the one or more adapters in the adapter set.

In an embodiment, the adapter orchestration service further comprises a second application programming interface that comprises one or more functions for checking a status of an instance of one or more adapters in the adapter orchestration service.

In an embodiment, the adapter orchestration service comprises one or more instances of the one or more adapters, wherein each of the one or more instances is mapped to a pair of a client and a set of credentials for authenticating with a service that sends or receives the data in the domain-specific format. In an embodiment, no client data are stored in the one or more instances.

In an embodiment, the one or more adapters process the data asynchronously.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for AOaaS. Via abstraction, AOaaS enables the complexity of adapter orchestration to be offloaded from the user, to provide an easier and more seamless adapter experience. With AOaaS, users can instantiate, manage, and operate their adapters, without having to understand any of the underlying runtime or configuration details as conventionally required.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Infrastructure

Figure 1A:
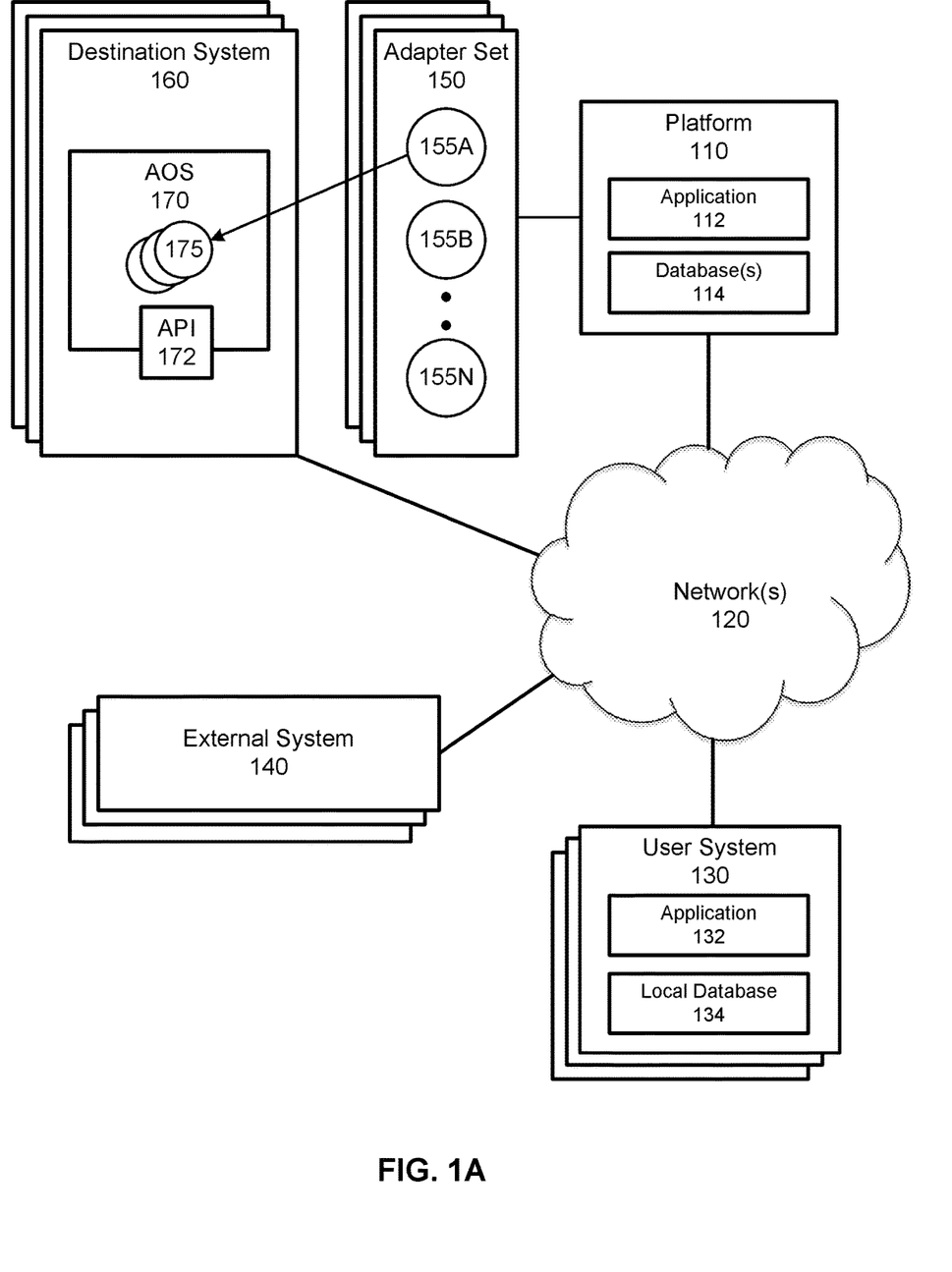
FIG. 1A illustrates an example infrastructure in which one or more of the processes described herein, may be implemented, according to an embodiment.

FIG. 1A illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) and/or one or more destination systems 160 via one or more networks 120.

Network(s) 120 may comprise the Internet, and platform 110 may communicate with other systems (e.g., 130, 140, 160) through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130, external systems 140, and/or destination systems 160 via the Internet, but may be connected to one or more other user systems 130, external systems 140, and/or destination systems 160 via an intranet. Furthermore, while only a few user systems 130, external systems 140, and destination systems 160, one server application 112, and one set of database(s) 114 are illustrated, it should be understood that the infrastructure may comprise any number of user systems, external systems, destination systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines (ATMs), and/or the like. However, it is contemplated that a user system 130 would typically comprise the personal computer or workstation of a user associated with an organizational account on platform 110. The user may utilize user system 130 to access a user account (e.g., under the organization account) with platform 110, according to one or more roles or permissions associated with the user account, which may be identified via authentication.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may comprise, be communicatively coupled with, or otherwise have access to one or more database(s) 114. For example, platform 110 may comprise one or more database servers which manage one or more databases 114. Server application 112 executing on platform 110 and/or client application 132 executing on user system 130 may submit data (e.g., user data, form data, etc.) to be stored in database(s) 114, and/or request access to data stored in database(s) 114. Any suitable database may be utilized, including without limitation My SQL™, Oracle™ IBM™, Microsoft SQL™, Access™, PostgreSQL™, MongoDB™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130, may interact with a server application 112 executing on platform 110 to execute one or more or a portion of one or more of the various functions, processes, methods, and/or software modules described herein. In an embodiment, client application 132 may utilize a local database 134 for storing data locally on user system 130.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

In an embodiment, the application (e.g., server application 112 and/or client application 132) is used to select a set 150 of adapters 155 (e.g., comprising adapters 155A, 155B, ... 155N), as discussed in more detail elsewhere herein. Each adapter set 150 may be associated with an account (e.g., user account or organization account) on platform 110. An adapter set 150 may be built by a user for the corresponding account via a graphical user interface of the application (e.g., server application 112 and/or client application 132) and stored as one or more data structures in database(s) 114.

In AOaaS, a user may deploy an adapter orchestration service 170 to a destination system 160 on demand. Adapter orchestration service 170 may be a container environment, which offers scalable computing resources for adapter set 150. Adapter orchestration service 170 may have a thin API 172, through which an AOaaS client (e.g., platform 110, user system 130, external system 140, destination system 160, or other system) can instantiate or "spin up" an adapter 155 into an adapter instance 175 in adapter orchestration service 170 operating on destination system 160. API 172 may provide an interface for common actions, such as spinning up a new adapter instance 175, spinning down an existing adapter instance 175, checking the status of an adapter instance 175, and/or the like.

Destination system 160 may be a public cloud or private cloud comprising a plurality of computing resources, including computer processors and data storage. These computing resources may be housed within a single data center or a plurality of data centers distributed over multiple geographic locations. A cloud-based destination system 160 may dynamically allocate subsets of the available computing resources to adapter orchestration service 170 on demand, with upscaling and downscaling of computing resources according to real-time demand of adapter instances 175, without direct active management by a user. Adapters 155 may be multi-cloud enabled by default. Alternatively, destination system 160 may be an on-premises system that hosts or has access to local applications. In general, adapter orchestration service 170 may be deployed to any environment. In any case, adapter orchestration service 170 may allocate subsets of its available computing resources to the various adapter instances 175.

Figure 1B:
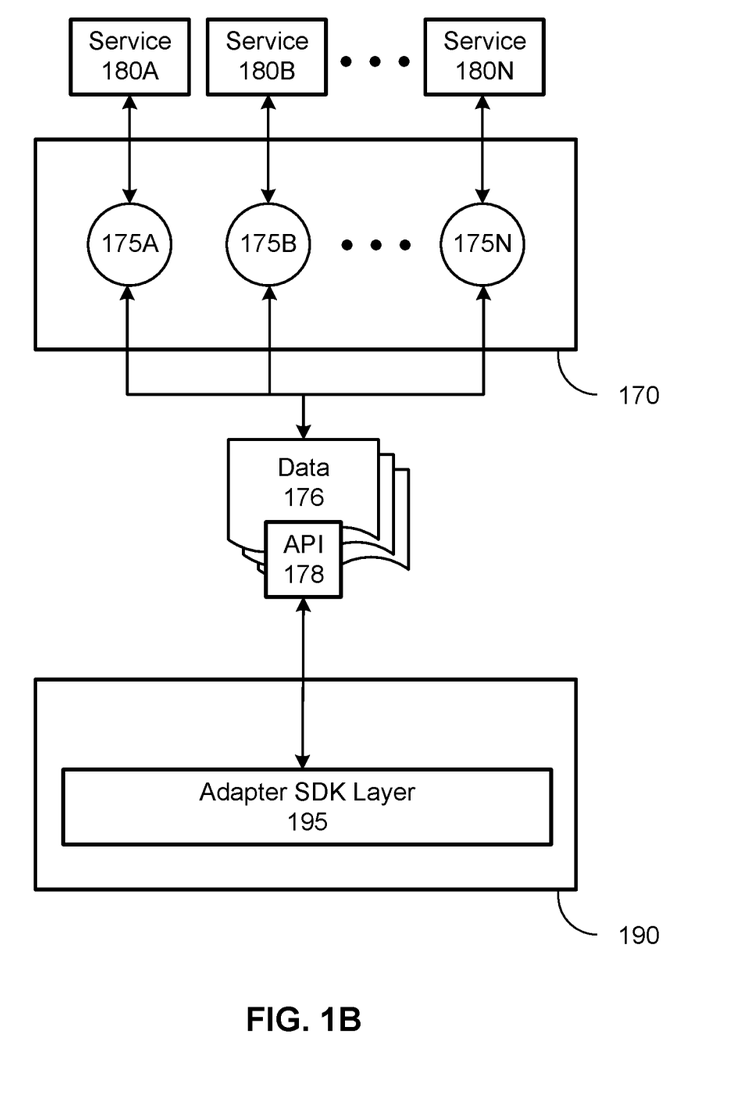
FIG. 1B illustrates an example data flow for an adapter orchestration service, according to an embodiment.

FIG. 1B illustrates an example data flow for adapter orchestration service 170, according to an embodiment. Adapter orchestration service 170 may be an environment for deploying adapter instances 175 (e.g., 175A, 175B, ... 175N) of special-purpose adapters 155. Each adapter 155 may implement a domain-specific protocol and API for communicating with a specific service 180 (e.g., 180A, 180B, ... 180N). Each adapter 155 may also implement a general-purpose "document" abstraction that translates data between the format of the specific service 180 (e.g., database result set) and an internal format. For example, data received from a service 180 may be translated from a domain-specific format into data 176 in the internal format, and/or data 176 in the internal format may be translated into data in the domain-specific format used by service 180. Data 176 may be stored in "documents."

Each adapter instance 175 may be a containerized plugin to adapter orchestration service 170. Each adapter instance 175 may implement both domain-specific code to interface with a particular service 180 and accept data 176 as input and/or output data 176. An adapter instance 175 may implement common semantic operations that many services offer, such as GET, POST, DELETE, LIST, and other operations. In an embodiment, all adapter instances 175 are transient and do not store connection data or other client information in adapter orchestration service 170. Specific adapter instances 175 may be created on request and destroyed after a period of inactivity.

Data 176 may comprise the data for a request to an adapter instance 175 or response from an adapter instance 175, as well as any metadata about this data. For example, the metadata may comprise the type of encoding, compression, format, and/or the like of the data received or sent by adapter instance 175.

Data 176 may be retrieved from adapter instances 175 and/or supplied to adapter instances 175 via a document API 178. For example, an adapter software development kit (SDK) layer 195, executing in a client environment 190, may communicate with adapter instances 175 via document API 178. Adapter SDK layer 195 may send data through document API 178 to an adapter instance 175 to be communicated to a service 180, and/or adapter SDK layer 195 may receive data from an adapter instance 175, which in turn received the data from a service 180, through document API 178.

An adapter SDK may provide libraries that implement adapter SDK layer 195 for one or more programming languages, such as Python™, Ruby™, Java™, Go™, and/or the like, and be capable of running in any client environment 190. Thus, a developer may utilize an existing library to retrieve data from a service 180 and/or send data to a service 180, without having to understand the underlying details. The libraries may be incorporated into any application or other software.

In an embodiment, an integrated development environment (IDE) may be provided for developing software that utilizes adapters 155. The IDE may enable users to run scripts, and manage and customize adapter orchestration service 170 in a low-code format, including managing compute units, memory, network settings, and/or the like.

2. Example Processing Device

Figure 2:
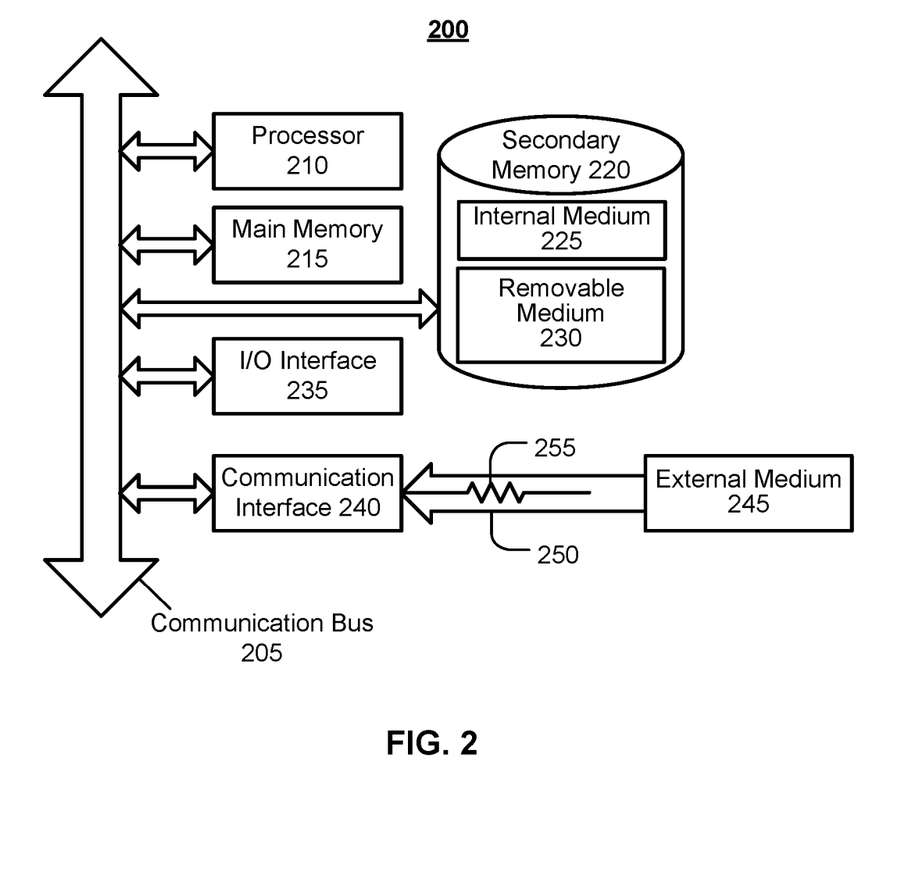
FIG. 2 illustrates an example processing system, by which one or more of the processes described herein may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute any of the software) described herein, and may represent components of platform 110, user system(s) 130, external system(s) 140, destination system(s) 160, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 may be connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, messaging bus, and/or control bus (not shown). Communication bus 205 may comprise any standard or non-standard bus architecture such as, for example, bus architectures compliant with instruction set architecture (ISA), extended instruction set architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, event-driven architecture (EDA), publish-and-subscribe (pub-sub), a data mesh, singleton, point-to-point, remote procedure call (RPC) and its derivatives, inter-process communication (IPC), and/or the like, including any other current or future data, messaging, or network technology (e.g., quantum networking).

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like.

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as any of the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

3. Adapter Selection

Figure 3:
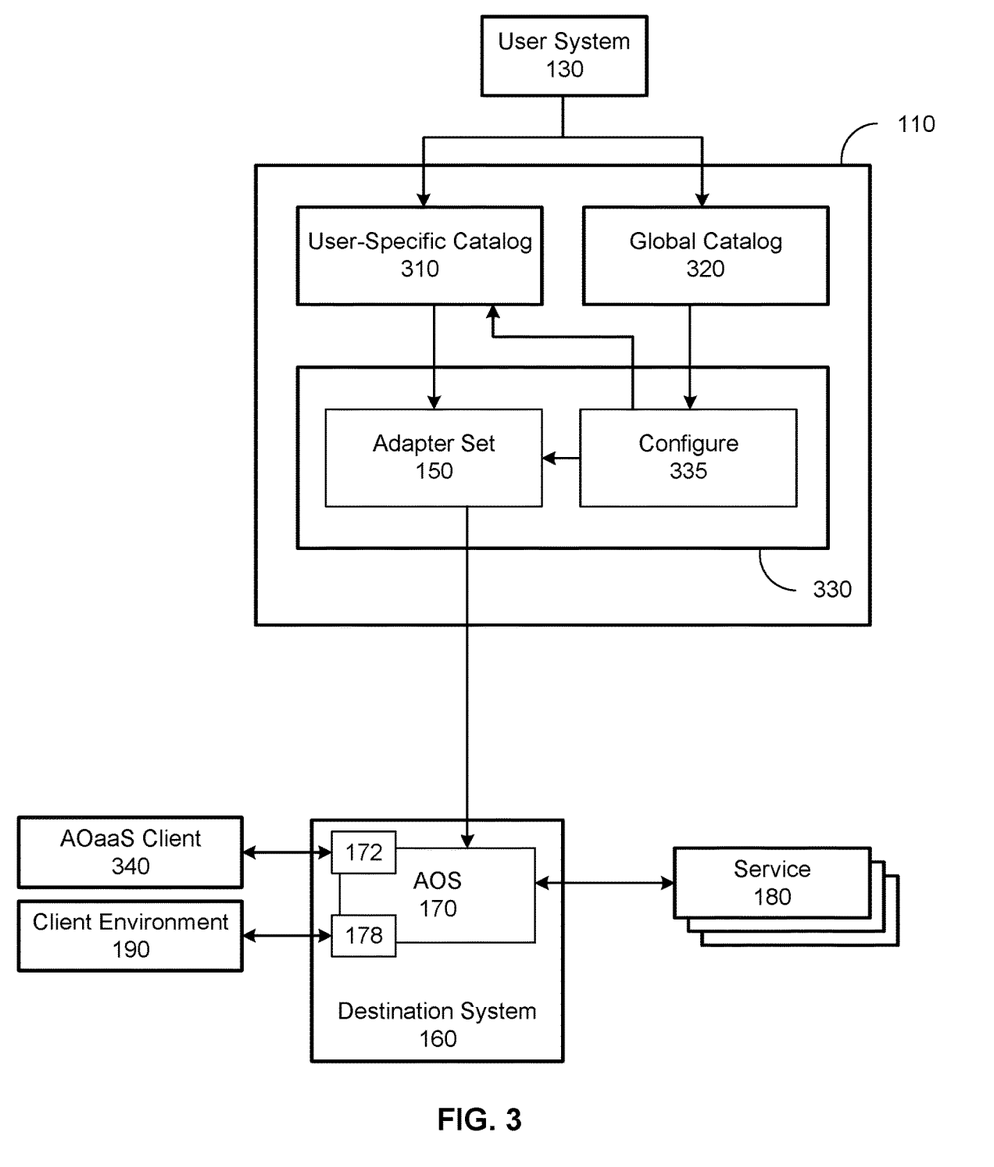
FIG. 3 illustrates adapter selection, according to an embodiment.

FIG. 3 illustrates adapter selection, according to an embodiment. Platform 110 may maintain a user-specific catalog 310 of available adapters 155 for each account (e.g., for a specific user or for an entire organization), as well as a global catalog 320 of available adapters that is accessible to all accounts (e.g., across a plurality of organizations and/or to the public). A user may browse user-specific catalog 310 in a graphical user interface, via user system 130, and select one or more user-configured adapters 155 from user-specific catalog 310 to be added to an adapter set 150, maintained by connectivity service 330. In addition, a user may upload new adapters 155 to user-specific catalog 310. Additionally or alternatively, a user may browse global catalog 320 in a graphical user interface, via user system 130, and select one or more unconfigured adapters 155 from global catalog 320. The user may configure the parameters of the selected adapters 155 via a configurator 335 of connectivity service 330, and the configured adapters 155 may be added to adapter set 150. The parameters may include any operating parameters, including, without limitation, high availability, redundancy, fault tolerance, interfaces, specific payload logic, start and run logic, and/or the like. Configured adapters 155 from global catalog 320 may be add to user-specific catalog 310 for future selection.

Global catalog 320 enables users to browse an extensive list of adapters 155 and configure a uniform adapter set 150 for their specific applications, including any customizations. Both pure developers and novice business users can leverage global catalog 320.

Each adapter 155 in user-specific catalog 310 and global catalog 320 may translate data, in different formats from different interfaces and communicated via different protocols, to a single internal format that is accessible via a single document API 178. Thus, users no longer need to learn different formats, interfaces, or protocols. A user can simply add adapters 155 to an adapter set 150 for an adapter orchestration service 170 that collectively encompass all of the services 180 required by an organization, deploy the adapter orchestration service 170 to a destination system 160, and provide and consume data 176 via a single document API 178. Document API 178 acts as a common gateway for all of the connectivity required by the organization.

In an embodiment, developers may contribute new adapters 155 to global catalog 320. For example, a developer of a service 180 may upload a new domain-specific adapter 155 for their service 180 to their user-specific catalog 310, deploy and test the new domain-specific adapter 155 using adapter SDK layer 195, and then register the final new domain-specific adapter into global catalog 320. Other users may select the domain-specific adapter 155 from global catalog 320, and configure and deploy the domain-specific adapter 155 as an adapter instance 175 to communicate with the service 180 (e.g., in an integration process). Thus, regardless of the particular requirements of service 180 (e.g., database access behind a firewall, a web service, a proprietary filed-based upload, etc.), an adapter 155 can be quickly built to "set it and forget it," and then easily disseminated to expose the service 180 via the common document API 178.

Adapters 155 in user-specific catalog 310 and global catalog 320 may be periodically updated in the background, without user intervention. For example, as a new version of an adapter 155 becomes available, the old version of the adapter 155 may be automatically replaced in the background. Thus, the next time the user instantiates an adapter instance 175 from the adapter 155, the new version of the adapter 155 will be instantiated, instead of the old version. Accordingly, an organization does not have to worry about actively maintaining updated versions of adapters 155 for the services 180 it utilizes.

4. Adapter Deployment

A user may log in to a user account on platform 110 to browse user-specific catalog 310 and/or global catalog 320 via a graphical user interface, select one or more adapters 155 from the catalog(s) (e.g., representing service(s) 180 with which communication is desired), and publish the selected adapters to adapter set 150. Then, the user may utilize the graphical user interface to deploy one or more adapter orchestration services 170 to one or more destination systems 160. In an embodiment, the graphical user interface may be streamlined, such that a user can deploy a set of adapters 150 in as few as three clicks (e.g., select adapters, enter privileges, and deploy the adapters).

Each adapter orchestration service 170 may comprise one or more adapter instances 175 that provide communication between one or more services 180 and a client environment 190. In particular, each adapter instance 175 may translate data from a format used by a service 180 to an internal format that is accessible via document API 178, and/or translate data from the internal format to the format used by the service 180. Thus, software (e.g., an adapter SDK, application, integration process, etc.), executing in client environment 190, may receive data from service(s) 180 and/or send data to service(s) 180, via document API 178. Adapter orchestration service 170 routes requests through document API 178 to the correct adapter instances 175 to be translated into the correct domain-specific format and communicated to the relevant service 180.

In addition, an AOaaS client 340 (e.g., platform 110, user system 130, external system 140, destination system 160, or other system) may reconfigure adapter orchestration service 170 via API 172. In particular, AOaaS may communicate with adapter orchestration service 170, via API 172, to spin up new adapter instances 175, spin down existing adapter instances 175, reconfigure existing adapter instances 175, check the status of adapter instances 175 (e.g., real-time monitoring of adapter data with TCP/IP payload information), and/or the like.

Figure 4:
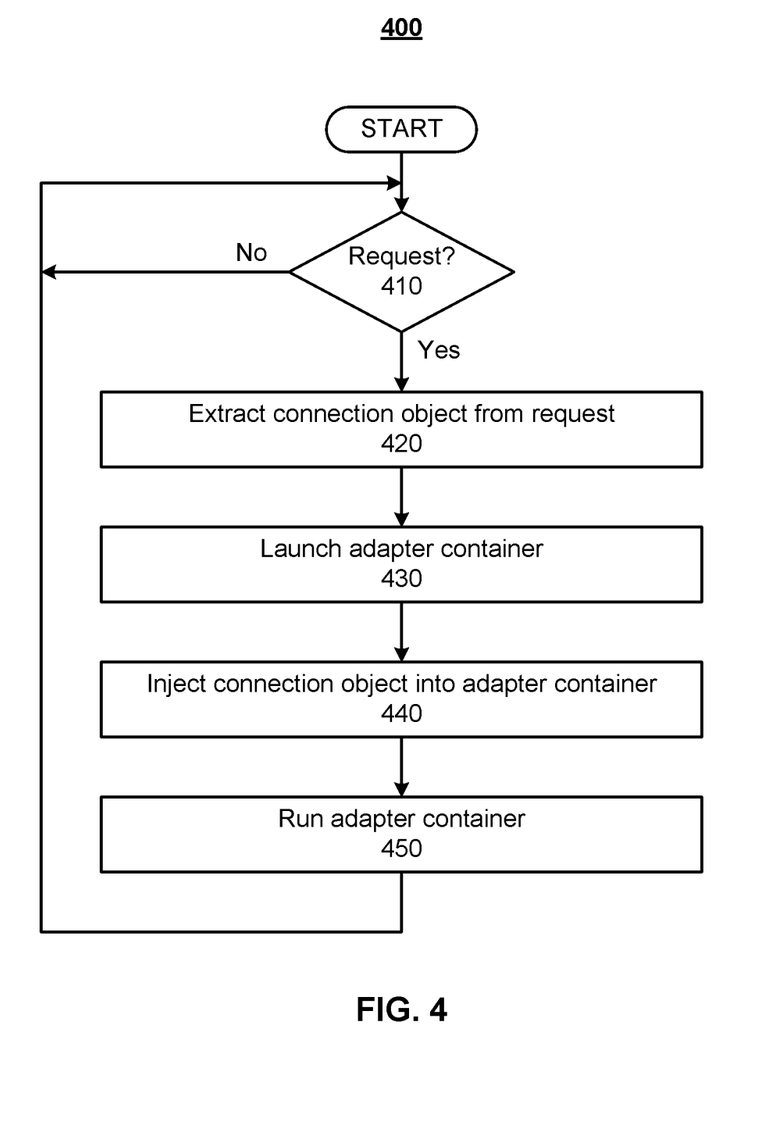
FIG. 4 illustrates an example process for spinning up a new adapter instance, according to an embodiment.

FIG. 4 illustrates an example process 400 for spinning up a new adapter instance 175, according to an embodiment. Process 400 may be implemented by API 172 of adapter orchestration service 170. While process 400 is illustrated with a certain arrangement and ordering of subprocesses, process 400 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In subprocess 410, if a new request is received (i.e., "Yes" in subprocess 410), process 400 proceeds to subprocess 420. The new request may be received via a remote procedure call by AOaaS client 340 to a function of API 172. The new request may comprise a connection object, as well as information about the desired adapter(s) 155. It should be understood that as long as no new request is received (i.e., "No" in subprocess 410), process 400 may do nothing.

In subprocess 420, the connection object is extracted from the request. In an embodiment, the connection object is encrypted in the request. In this case, the connection object is decrypted. The connection object may comprise connection information, such as credentials for accessing the associated service 180, an address of the associated service 180, access privileges for AOaaS client 340, and/or the like.

In subprocess 430, an adapter container is launched for the adapter 155 that is indicated in the adapter information of the request. The adapter container may be a relatively stateless container configured to contain the adapter code and any supporting code. It should be understood that in this context, "code" refers to software instructions that can be executed by a processor. The adapter code may be hot-loaded during launch or pre-warmed for commonly used adapters 155. The supporting code may comprise the runtime environment (e.g., Java Runtime Environment) for the adapter, one or more functions that support the orchestration services and/or the adapter SDK, and/or the like.

In subprocess 440, the extracted connection object is injected into (e.g., stored in) the memory of the adapter container. Each adapter container may be lightweight and map to a single pair of client (e.g., representing client environment 190) and set of credentials (e.g., for authenticating with a service 180). In an embodiment, no client data are stored or cached in the container. For example, the client data may be temporarily stored in memory in the adapter container, exposed by adapter orchestration service 170, so that an adapter instance 175 may access the client data (e.g., credentials) when making requests. However, in this embodiment, the client data are not persistently stored or cached in the adapter container between requests. This enables adapter orchestration service 170 to move an adapter container around as needed (e.g., to another destination system 160). In addition, the lifecycle of each adapter container can be managed entirely by adapter orchestration service 170, since spinning them up and down is relatively inexpensive. Each adapter instance 175 is a discrete, fully autonomous unit of compute and memory that can be ported to any environment and runtime (e.g., Docker™, Kubernetes™, Java™ Amazon Web Services™ (AWS), Google Cloud Platform™ (GCP), VMware™, etc.).

In subprocess 450, the adapter container is run as an adapter instance 175. A client environment 190 may process data 176, received and translated from the service 180 associated with adapter instance 175 and/or translated and sent to the service 180 associated with adapter instance 175, in a synchronous or asynchronous manner. In an embodiment, adapter orchestration service 170 may, by default, execute data transfers in a non-serialized format to leverage an asynchronous topology. Notably, adapter instances 175 hide the details of the API required to interact with each service 180 from client environment 190. Advantageously, client environment 190 can access all of data 176, collected by adapter orchestration service 170 from all services 180, through a single, open, document API 178. Document API 178 provides a single common end-point or gateway for client environment 190 to access data 176, regardless of the location of services 180 (e.g., whether public or behind a firewall).

Adapter orchestration service 170 may manage a set of discrete compute capacity. In an embodiment, adapter orchestration service 170 provisions the computer capacity to adapter instances 175 on-demand with vertical and/or horizontal scalability based on configured settings and criteria. These settings and/or criteria may be set or modified via API 172.

Advantageously, AOaaS acts as the glue between disparate services 180, protocols, and data formats. The disclosed AOaaS makes adapters simple to use for a variety of different types of users, while remaining flexible and powerful for a variety of uses. AOaaS may implement a connection paradigm that is primarily focused on an extract, transform, load (ETL) concept, with transformation or post-processing happening subsequent to the final load, in a client environment 190, which may be an iPaaS system or data warehouse.

Users of the described AOaaS may include citizen integrators, independent software vendors, enterprise developers, and/or iPaaS platform services. Citizen integrators may utilize AOaaS to quickly enable a connectivity gateway API for their organizations without the overhead of setting up complicated API management tools or building out orchestrations. Independent software vendors (e.g., SAP™, ServiceNow™, etc.) may utilize AOaaS to leverage API-enabled adapters 155 for last-mile integration. Enterprise developers may utilize AOaaS to take advantage of a global catalog 320 of adapters 155 as part of a development toolkit. An iPaaS platform, such as Boomi's platform, may utilize AOaaS to offer standard adapters 155 across its subscription services.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method of adapter orchestration as a service (AOaaS) comprising using at least one hardware processor to:
   receive a selection of one or more adapters from a catalog;
   add the selected one or more adapters to an adapter set that comprises a plurality of adapters, wherein each of the plurality of adapters communicates with a respective service, among a plurality of services, and translates data between a domain-specific format of the respective service and a standard internal format, and wherein each of the plurality of adapters communicates with a different respective service than any of the other plurality of adapters; and
   deploy the adapter set, including an adapter instance of each of the plurality of adapters, within an adapter orchestration service to at least one destination system, wherein each adapter instance is a discrete, fully autonomous, portable unit of compute and memory, and wherein the adapter orchestration service comprises a first application programming interface that comprises one or more functions for interacting with the data, in the standard internal format, for all of the plurality of adapters for all of the plurality of services.

2. The method of claim 1, wherein the adapter orchestration service further comprises a second application programming interface that comprises one or more functions that spin up a new adapter instance of at least one of the plurality of adapters in the adapter set.

3. The method of claim 2, wherein spinning up the new adapter instance of the at least one adapter comprises:
   receiving a request from an AOaaS client, wherein the request comprises a connection object and adapter information for at least one adapter;
   extracting the connection object from the request;
   launching an adapter container based on the adapter information;
   injecting the connection object into memory of the adapter container; and
   running the adapter container as the new adapter instance of the at least one adapter.

4. The method of claim 3, wherein the adapter container comprises adapter code and supporting code.

5. The method of claim 1, wherein the adapter orchestration service further comprises a second application programming interface that comprises one or more functions that spin down an existing adapter instance of at least one of the plurality of adapters in the adapter set.

6. The method of claim 1, wherein the adapter orchestration service further comprises a second application programming interface that comprises one or more functions for checking a status of an existing adapter instance of any one of the plurality of adapters in the adapter orchestration service.

7. The method of claim 1, wherein each adapter instance is mapped to a pair of a client and a set of credentials for authenticating with the respective service that sends or receives the data in the domain-specific format.

8. The method of claim 7, wherein no client data are stored in the adapter instances.

9. The method of claim 1, wherein the plurality of adapters process the data asynchronously.

10. A system comprising:
    at least one hardware processor; and
    software that is configured to, when executed by the at least one hardware processor,
      receive a selection of one or more adapters from a catalog,
      add the selected one or more adapters to an adapter set that comprises a plurality of adapters, wherein each of the plurality of adapters communicates with a respective service, among a plurality of services, and translates data between a domain-specific format of the respective service and a standard internal format, and wherein each of the plurality of adapters communicates with a different respective service than any of the other plurality of adapters, and
      deploy the adapter set, including an adapter instance of each of the plurality of adapters, within an adapter orchestration service to at least one destination system, wherein each adapter instance is a discrete, fully autonomous, portable unit of compute and memory, and wherein the adapter orchestration service comprises a first application programming interface that comprises one or more functions for interacting with the data, in the standard internal format, for all of the plurality of adapters for all of the plurality of services.

11. The system of claim 10, wherein the adapter orchestration service further comprises a second application programming interface that comprises one or more functions that spin up a new adapter instance of at least one of the plurality of adapters in the adapter set.

12. The system of claim 11, wherein spinning up the new adapter instance of the at least one adapter comprises:
receiving a request from an adapter orchestration as a service (AOaaS) client, wherein the request comprises a connection object and adapter information for at least one adapter;
extracting the connection object from the request;
launching an adapter container based on the adapter information;
injecting the connection object into memory of the adapter container; and
running the adapter container as the new adapter instance of the at least one adapter.

13. The system of claim 12, wherein the adapter container comprises adapter code and supporting code.

14. The system of claim 10, wherein the adapter orchestration service further comprises a second application programming interface that comprises one or more functions that spin down an existing adapter instance of at least one of the plurality of adapters in the adapter set.

15. The system of claim 10, wherein the adapter orchestration service further comprises a second application programming interface that comprises one or more functions for checking a status of an existing adapter instance of one of the plurality of adapters in the adapter orchestration service.

16. The system of claim 10, wherein each adapter instance is mapped to a pair of a client and a set of credentials for authenticating with the respective service that sends or receives the data in the domain-specific format.

17. The system of claim 16, wherein no client data are stored in the adapter instances.

18. The system of claim 10, wherein the plurality of adapters process the data asynchronously.

19. A non-transitory computer-readable medium having instructions stored therein, wherein the instructions, when executed by a processor, cause the processor to:
receive a selection of one or more adapters from a catalog;
add the selected one or more adapters to an adapter set that comprises a plurality of adapters, wherein each of the plurality of adapters communicates with a respective service, among a plurality of services, and translates data between a domain-specific format of the respective service and a standard internal format, and wherein each of the plurality of adapters communicates with a different respective service than any of the other plurality of adapters; and
deploy the adapter set, including an adapter instance of each of the plurality of adapters, within an adapter orchestration service to at least one destination system, wherein each adapter instance is a discrete, fully autonomous, portable unit of compute and memory, and wherein the adapter orchestration service comprises a first application programming interface that comprises one or more functions for interacting with the data, in the standard internal format, for all of the plurality of adapters for all of the plurality of services.

20. The non-transitory computer-readable medium of claim 19, wherein the adapter orchestration service further comprises a second application programming interface that comprises one or more functions that spin up a new adapter instance of at least one of the plurality of adapters in the adapter set, one or more functions that spin down an existing adapter instance of at least one of the plurality of adapters in the adapter set, and one or more functions for checking a status of an existing adapter instance of any one of the plurality of adapters in the adapter orchestration service.

* * * * *